(12) United States Patent
Chadwick et al.

(10) Patent No.: US 7,141,197 B2
(45) Date of Patent: Nov. 28, 2006

(54) GRIP ELEMENT

(75) Inventors: Barry Chadwick, Guilford, CT (US); Roger F. Lockshier, Monroe, CT (US); Arthur R. Hamilton, Jr., Indian Rocks Beach, FL (US); Phillip A. Johnson, Clearwater, FL (US)

(73) Assignee: BIC Corporation, Milford, CT (US)

( * ) Notice: Subject to any disclaimer, the term of this patent is extended or adjusted under 35 U.S.C. 154(b) by 691 days.

(21) Appl. No.: 10/633,354

(22) Filed: Aug. 1, 2003

(65) Prior Publication Data

US 2004/0036194 A1 Feb. 26, 2004

Related U.S. Application Data

(62) Division of application No. 09/671,819, filed on Sep. 27, 2000, now Pat. No. 6,652,941.

(51) Int. Cl.
*B29C 45/14* (2006.01)
*B29C 45/16* (2006.01)
*B29C 47/06* (2006.01)

(52) U.S. Cl. .................. 264/250; 264/209.1; 264/255; 264/260; 264/271.1

(58) Field of Classification Search ............... 264/250, 264/248, 255, 209.1, 271.1, 275, 260
See application file for complete search history.

(56) References Cited

U.S. PATENT DOCUMENTS

| | | | | |
|---|---|---|---|---|
| 2,205,769 A | * | 6/1940 | Sweetland | 81/492 |
| 2,495,119 A | * | 1/1950 | McDevitt | 264/157 |
| 3,374,503 A | * | 3/1968 | Boniger | 425/129.1 |
| 4,186,924 A | * | 2/1980 | Southey | 473/203 |
| 4,338,270 A | * | 7/1982 | Uffindell | 264/46.4 |
| 4,712,304 A | | 12/1987 | Sanelli | 30/343 |
| 4,785,495 A | * | 11/1988 | Dellis | 16/421 |
| 4,934,024 A | | 6/1990 | Sexton, I | 16/421 |
| 5,087,042 A | * | 2/1992 | Solheim | 473/303 |

(Continued)

FOREIGN PATENT DOCUMENTS

FR 2 622 512 A3 10/1988

OTHER PUBLICATIONS

BIC® Cristal Grip™pen, ca. 1998.

(Continued)

*Primary Examiner*—Edmund H. Lee
(74) *Attorney, Agent, or Firm*—Jones Day

(57) ABSTRACT

A grip element having a soft, compressible and deformable outer layer supported by an underlying support structure sufficiently rigid to maintain a receiving channel of the grip element in an open configuration. The support structure facilitates manipulation of the grip element and assembly of the grip element onto a hand-held article without having the outer layer collapse on itself as would occur without the support structure as a result of the soft, deformable nature of the outer layer. The grip element may be formed separately from the hand-held article on which it is to be assembled, and then positioned thereon such that the hand-held article is sold with the grip element pre-assembled thereon. If desired, the grip element may be provided separate from the hand-held article, the outer layer providing a readily compressible and deformable soft cushioning surface and the support structure facilitating insertion of the outer layer over at least a portion of a hand-held article. The outer layer and support structure may be co-molded such that the materials thereof are permanently and directly bonded together. If desired, a pattern may be formed on the outer layer, such as grooves, dimples, ribs, bumps, a lattice pattern, or a honeycomb pattern.

12 Claims, 2 Drawing Sheets

U.S. PATENT DOCUMENTS

| | | | |
|---|---|---|---|
| 5,097,566 A | 3/1992 | Decker et al. | 16/421 |
| 5,125,286 A | 6/1992 | Wilson | 473/298 |
| 5,261,665 A | 11/1993 | Downey | 16/DIG. 12 |
| 5,290,063 A | 3/1994 | Lenhart | 135/76 |
| 5,564,316 A | 10/1996 | Larson et al. | 74/489 |
| 5,584,213 A | 12/1996 | Larson et al. | 74/489 |
| 5,823,069 A | 10/1998 | Roark et al. | 16/DIG. 19 |
| 6,164,855 A | 12/2000 | Perry et al. | 401/6 |
| 6,199,447 B1 | 3/2001 | Lump et al. | 74/489 |
| 6,379,065 B1 | 4/2002 | Perry et al. | 401/6 |
| 6,488,426 B1 | 12/2002 | Perry et al. | |
| 6,786,835 B1 * | 9/2004 | Carter | 473/300 |
| 6,790,029 B1 * | 9/2004 | Downey | 425/577 |

OTHER PUBLICATIONS

BIC® Round Stic Grip pen, ca. 1998.
Extend™ pen, launch date in 2000.

* cited by examiner

GRIP ELEMENT

CROSS-REFERENCE To RELATED APPLICATION

This application is a division of U.S. patent application Ser. No. 09/671,819, filed Sep. 27, 2000 now U.S. Pat. No. 6,652,941.

FIELD OF THE INVENTION

The present invention relates generally to gripping features of hand-held articles. More particularly, the present invention relates to a grip element which is made from a soft, readily deformable material but which also is easy to manufacture and easy to assemble on a hand-held article.

BACKGROUND OF THE INVENTION

Various hand-held articles are manufactured from smooth hard materials which are inexpensive and amenable to standard manufacturing processes. In order to increase comfort during gripping of the hand-held article and/or to decrease possible slippage because of the smoothness of the material, various grip elements have been designed for placement on the gripping portion of the hand-held article. Because such grip elements are provided to address different problems or consumer needs, a variety of different grip elements with different properties are available.

For instance, for purposes of increased comfort to consumers who grip a hand-held article very tightly, grip elements of soft foam are provided to permit ready deformation of the grip element and resulting enhanced comfort during gripping thereof. Other types of grip elements with low durometers (hardnesses) are known, such as on the Dr. Grip® writing instrument manufactured by Pilot® Corporation of America, of Trumbull Connecticut, and the PhD™ writing instrument manufactured by Sanford, of Bellwood, Ill. However, to permit ready handling of known soft grip elements during manufacture and to facilitate assembly on the hand-held article, such soft grip elements require more material than is really necessary to achieve the desired enhanced comfort, thus increasing size or bulk as well as material costs. Moreover, insertion of a thick-walled grip element over the gripping section of a hand-held article results in a hand-held article significantly bulkier than would be the case without such grip element.

However, thin-walled tubular elements formed from very soft materials are difficult to handle for various reasons. For instance, the thin wall easily collapses on itself, requiring additional supporting and manipulating devices to permit insertion over a hand-held article. If the tubular element is transported in bulk, such as in a vibrating bowl, then the plurality of tubular elements collapse in transit, requiring manipulation to recreate their tubular configuration. Moreover, if the material is so soft that it has a high coefficient of friction, the collapsed walls may stick to each other to a certain degree, further complicating the handling of the tubular element.

In addition, if a grip element is designed to reduce slippage, such characteristic may backfire by interfering with ready sliding over the exterior of a hand-held article into the desired position on the article. A thin-walled grip element may stick to itself and wrinkle during insertion, further impeding insertion over the hand-held article.

Formation of the grip element directly on the gripping section of the hand-held article is one solution to the above-described problem of mounting a separately formed soft grip element onto a hand-held article. However, such solution has its drawbacks as well. If a molding process, such as a two-shot injection molding process, is used then the grip element is molded over a substrate which is typically the hand-held article itself. Because the hand-held article typically has a unique shape, the requisite mold complexity for such molding is relatively high, with accompanying high costs. The resulting mold process would likewise be expensive in order to control the high tolerances and critical features necessary to create a substrate with the desired features. For example, if the grip element is to be provided on a writing instrument, then the substrate is a writing instrument body which may have particular features requiring a complex, and thus expensive, mold. Moreover, if the substrate is the entire hand-held article, then only a limited number of mold cavities can be used per cycle for a given mold or press size.

Thus, it would be desirable to form a grip element from a material soft enough to provide the desired enhanced comfort while configuring the grip element to be readily assembled over the gripping section of the hand-held article.

SUMMARY OF THE INVENTION

In accordance with the principles of the present invention, a grip element configured for positioning over a hand-held article is formed with at least two layers. The layers of the grip element include an outer layer formed from a soft, readily compressible and deformable material and a support structure formed from a relatively rigid material capable of maintaining the desired shape of the grip element. Preferably, the outer layer is also resilient and the support structure is also flexible. In addition, the thickness of the support structure is selected to be the lowest thickness possible for maintaining the desired configuration of the grip element without collapsing on itself. Thus, the grip element is easily handled and/or manipulated for insertion over a gripping section of a hand-held article.

The grip element may be formed by providing the support structure in the desired shape of the finished grip element and then providing the outer layer over the formed support structure. Because the support structure is capable of maintaining the desired shape of the grip element, the outer layer need only be thick enough to impart the desired grip enhancing properties. Accordingly, a relatively thin outer layer which would likely not be manipulable on its own is supported by the underlying support structure and thus is readily manipulable. The resulting grip element thus has properties and characteristics which would not have been achievable with an outer layer as thin as provided if the support layer were not also provided as in accordance with the present invention.

In one embodiment, the grip element is formed as a tubular element having a longitudinal extent shorter than the longitudinal extent of the hand-held article onto which the grip element is to be provided. In particular, the grip element is preferably configured to be positioned at only a gripping section of the hand-held article and thus need only be long enough to occupy such region. For example, the grip element may be a tubular element of sufficient length for at least two fingers to contact grip element to grip the hand-held article. Since such length typically is not much greater than two inches (approximately 5 cm), if the grip element is formed by a molding process, a higher number of cavitation molds may be used per mold cycle for a given mold press size to result in a higher productivity rate.

These and other features and advantages of the present invention will be readily apparent from the following detailed description of the invention, the scope of the invention being set out in the appended claims.

BRIEF DESCRIPTION OF THE DRAWINGS

The detailed description will be better understood in conjunction with the accompanying drawings, wherein like reference characters represent like elements, as follows.

DETAILED DESCRIPTION OF THE INVENTION

Figure 1:
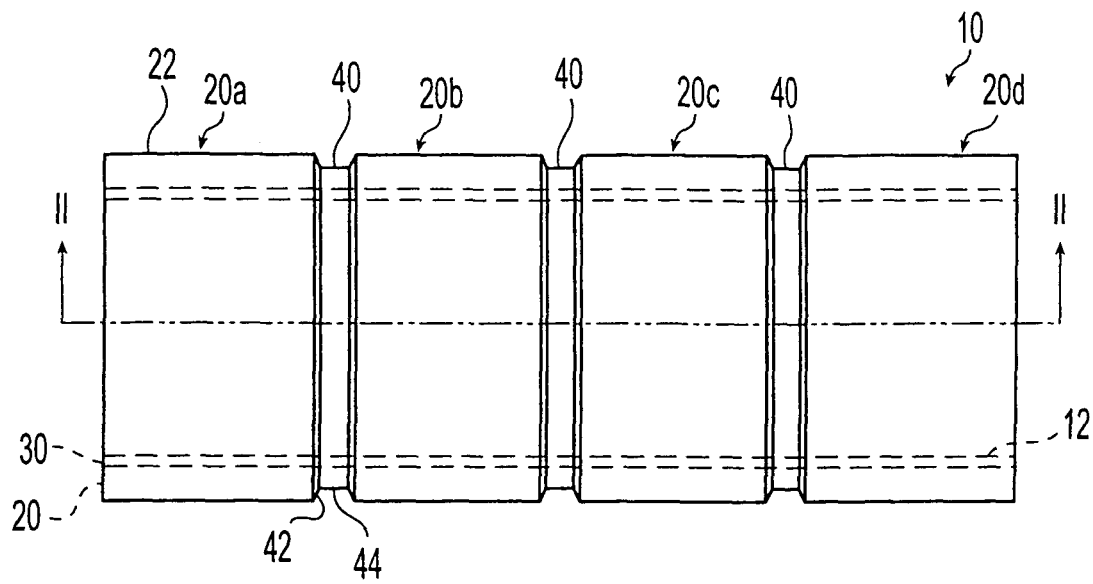
FIG. 1 is a side elevational view of a grip element formed in accordance with the principles of the present invention.
Figure 2:
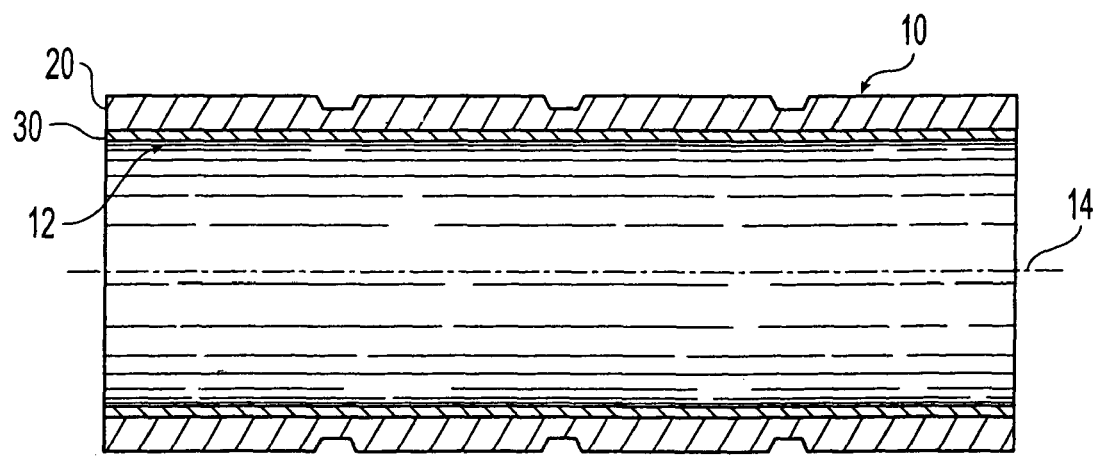
FIG. 2 is a cross-sectional view along line II—II of FIG. 1.

Referring now to the drawings, an exemplary grip element 10 formed in accordance with the principles of the present invention is illustrated in FIGS. 1 and 2. Grip element 10 is configured to be positioned on a gripping portion of an article. Preferably, grip element 10 is formed with a mounting structure, such as a receiving channel 12 in which a portion of an article is inserted to mount grip element 10 thereon. It is noted that reference herein is made to a "receiving channel" for the sake of convenience, and not with any intent to limit the mounting structure to only a "receiving channel." For instance, grip element 10 may be inserted over a portion of a hand-held article and advanced until positioned over the gripping portion of the article. If more than one gripping portion is provided on a given hand-held article, then more than one grip element 10 may be provided, a grip element 10 being provided over each gripping portion. Grip element 10 may be positioned over a portion of an article which is specifically configured to receive grip element 10 or may be formed for insertion over an article not specially designed for receiving any type of element thereover. Thus, grip element 10 may be positioned in a recess to impart a substantially constant diameter to the article or may form a widened diameter portion of the article when mounted on the article.

Exemplary hand-held articles on which grip element 10 may be provided include, without limitation, writing instrument, razors, toothbrushes, and utensils such as for eating or cooking. If desired, grip element 10 may be formed to be specifically dimensioned and configured for a readily manipulable article and/or for an article which is gripped and/or manipulated by a user's fingers to alleviate pressure caused by excessive grip force being applied by the user without transmitting external forces to the user. Thus, grip element 10 may be configured to provide comfort and pressure alleviation to the user. Alternatively, grip element 10 may be applied to articles as handles of objects like impact tools (e.g., hammers), sports equipment (e.g., golf clubs or tennis rackets), motor-driven devices (e.g., power drills or motorcycles), etc., which are not intended for gripping and manipulation by only the fingers and/or which transmit impact or vibration or other potentially uncomfortable sensation to the user (i.e., such discomfort is not caused by the user's gripping but rather is imparted to the user by the article being gripped). Thus, grip element 10 may be configured to provide shock absorption during use of the article. As applied for comfort instead of shock absorption, grip element 10 need not have as thick a soft compressible layer as would be necessary to insulate the user from external forces, and may have a total outer diameter of preferably less than one inch (2.54 cm) for ready gripping by fingers alone. However, it will be appreciated that the principles of the present invention are applicable to any type of article grasped by a user.

Receiving channel 12 is configured to receive a portion of an article securely therein. Preferably, receiving channel 12 is dimensioned to correspond to the outer dimension of the portion of the article on which grip element 10 is to be mounted so that that portion is securely maintained therein. However, the mounting structure may be configured in any other manner to secure the article therein. For example, flexible ribs, which resiliently conform to the exterior of the portion of the article to be received within receiving channel 12, may be formed within receiving channel 12. If desired, the article and receiving channel 12 may be matingly contoured, such as by the provision of grooves on one and ribs on the other which mate or engage with each other. Other mating contours are within the scope of the present invention as well. In the embodiment of FIGS. 1 and 2, grip element 10 is tubular so that receiving channel 12 encloses an article therein. However, it will be appreciated that grip element 10 need not be completely tubular to enclose gripping portion article completely. Instead, receiving channel 12 may be configured to receive a portion of the article on which grip element 10 is to be provided. Thus, a portion of an article may be inserted into receiving channel 12 along longitudinal axis 14 of grip element 10 if receiving channel 12 is an enclosed channel, or transverse to longitudinal axis 14 if receiving channel 12 is an open channel.

Grip element 10 is configured to facilitate gripping of the article on which grip element 10 is positioned. Because articles such as hand-held articles may be gripped unduly tightly, and may be so hard that such tight gripping results in discomfort, grip element 10 is configured to increase comfort to the user during gripping of grip element 10 even when the user very tightly grips grip element 10 on an article. Alternatively, or in addition, grip element 10 may be configured to provide shock absorption, as described above. Accordingly, an outer layer 20 of a soft, readily compressible and deformable material having a sufficient thickness to permit deformation thereof is provided over the exterior surface 22 of grip element 10. The soft, compressible and deformable nature of outer layer 20 permits outer layer 20 to absorb gripping forces by deforming, thereby providing a cushion which is comfortable to grip, even when gripped tightly. The material from which outer layer 20 is formed may also be resilient so that after gripping forces are released therefrom, outer layer 20 returns to its original uncompressed configuration. For example, outer layer 20 may have a Shore A durometer of under 50, such as in the range of 0–50. The Shore A durometer may be as low as 5, or even lower, typically depending on the material used. On a Shore 00 scale, outer layer 20 may have a durometer of under 100, such as in the range of 50–100. Exemplary materials from which outer layer 20 may be formed include elastomers such as thermoplastic elastomers, e.g., MONPRENE® (sold by QST, Inc. of St. Albans, Vt.), SANTOPRENE® (exclusively licensed to Advanced Elastomer Systems, L.P. of Akron, Ohio), or DYNAFLEX™ (sold by GLS Corporation of McHenry, Ill.), or thermoset elastomers. Because of the degree of softness of outer layer 20, it is preferable to provide outer layer 20 on a rigid support structure 30 which is capable of maintaining a desired configuration of outer layer 20 to maintain a desired configuration for facilitating insertion of grip element 10 over an article, as discussed in greater detail below.

The material from which outer layer 20 is formed preferably is readily compressible to impart the desired cushioning or shock absorption effect to grip element 10 to increase user comfort as desired. Moreover, outer layer 20 may also be deformable and pliable and may have a thickness to permit a shifting of the material thereof in other than a radial direction (perpendicular to longitudinal axis 14) so that not all of the gripping force is applied radially toward the underlying hard article. For instance, outer layer 20 may shift, somewhat, in an axial direction as a result of gripping forces applied thereto. As a result, the user is not as affected by the hardness of the underlying article as may be the case without such shifting of outer layer 20.

Outer layer 20 is preferably sufficiently thick enough not only to permit such material shifting but also to prevent the hardness of the underlying article from dominating over the perceived cushioning effect of grip element 10. In a preferred embodiment, outer layer 20 is preferably at least 0.25±0.05 mm thick, and may be approximately 1.125 mm thick. However, thinner outer layers may be provided if the desired cushioning is achieved. Although there need not be an upper limit to the thickness of outer layer 20, it will be appreciated that the thicker outer layer 20 is, the more material is required to form outer layer 20, thus increasing manufacture costs. Accordingly, outer layer 20 preferably is no thicker than necessary to achieve the desired characteristics and properties thereof. An appropriate thickness to achieve these desired results may be readily determined by those of skill in the art depending on the material used for outer layer 20, support structure 30, and the hardness of the article over which grip element 10 is to be used.

In addition, the material from which outer layer 20 is formed may be selected to have a sufficiently high coefficient friction such that grip element 10 may be securely grasped by a user without slippage. However, the coefficient of friction of outer layer 20 should not be so high as to impart a tacky sensation (which may be perceived as unclean to the touch, particularly since dust and other small particles tend to adhere to tacky substances).

Various materials may be used to form outer layer 20 with any or all of the above-described characteristics. The selected material preferably also is amenable to the manufacturing process used to form grip element 10. Accordingly, thermoplastic or thermoset elastomers or resins may be used. Such materials are easy to use in manufacturing processes which may be used to form outer layer 20 (such as, but not limited to, injection molding or extrusion processes). Moreover, such materials may be obtained in extremely low durometer formulations which do not impart a tacky sensation.

In addition to properties or characteristics imparted to outer layer 20 by the nature of the material thereof, outer layer 20 may be formed or shaped to enhance tactile comfort even further. For instance, although outer layer 20 may have a smooth surface, various features may be provided on the surface thereof which may affect the overall tactile sensation imparted by outer layer 20 to grip element 10. As shown in the exemplary embodiment of FIGS. 1 and 2, circumferentially extending grooves 40 may be provided in outer layer 10. It will be appreciated that grooves 40 may extend axially or in other directions rather than circumferentially while still achieving the desired effect. Spacing between the grooves is selected to achieve the desired cushioning effect or perception of compressibility. The depth and width of grooves 40 is selected such that grooves 40 enhance comfort and preferably also enhance perceived compressibility. For instance, grooves 40 may provide breaks in outer layer 20 which result in reduced slippage. If desired, grooves 40 also may separate outer layer 20 into segments 20a, 20b, 20c, 20d to an extent which enhances the above-described axial shifting of outer layer 20. Preferably, grooves 40 extend only partially, such as approximately half-way, through the thickness of outer layer 10 and do not extend completely through the thickness of outer layer 10 so that outer layer 20 remains as a one-piece element. Additionally, grooves 40 may have a width selected to achieve the desired cushioning effect or perception of compressibility, such as about 1.5±0.05 mm. As will be appreciated, the above-described parameters will be affected by the material from which outer layer 20 is formed, one of ordinary skill in the art being able to determine values for each parameter. For example, the softness of outer layer 20 may affect the depth and spacing of the grooves, since wider grooves would permit greater deformation of a softer outer layer 20, with resulting increased cushioning and/or compressibility. Preferably, the edges of grooves 40 are chamfered such that grooves 40 do not present a sharp edge. For instance, the inner radial wall 42 of grooves 40 may be at about a 60° angle with respect to groove base 44.

Figure 3:
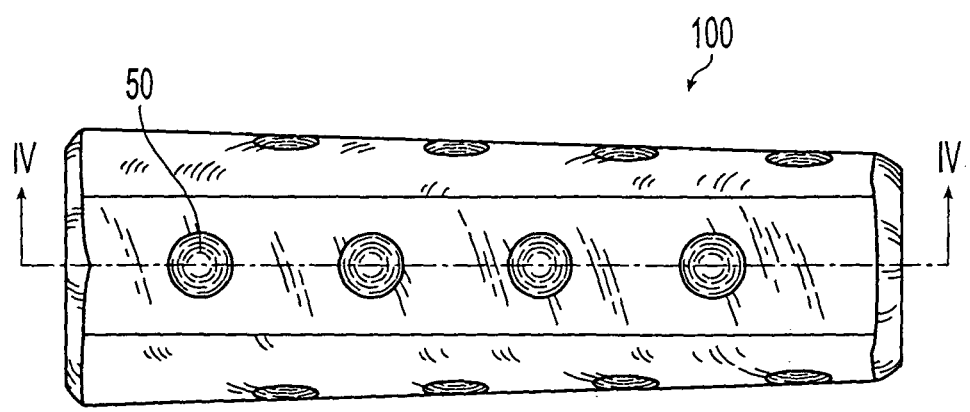
FIG. 3 is a side elevational view of another embodiment of a grip element formed in accordance with the principles of the present invention.
Figure 4:
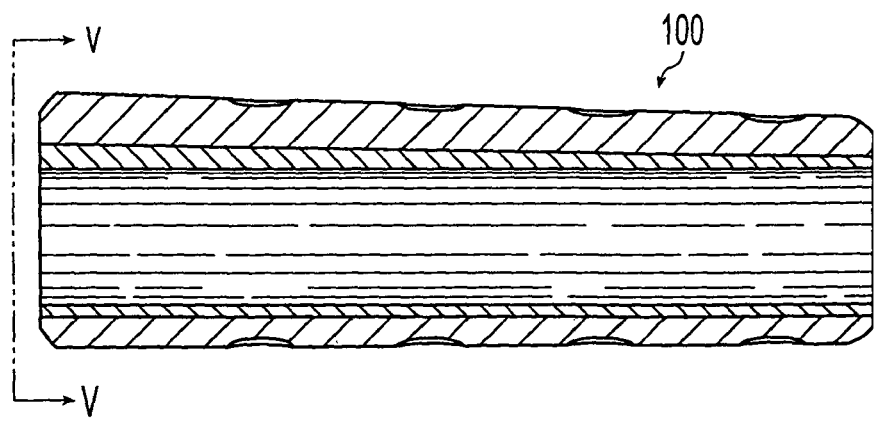
FIG. 4 is a cross-sectional view along line IV—IV of FIG. 3.
Figure 5:
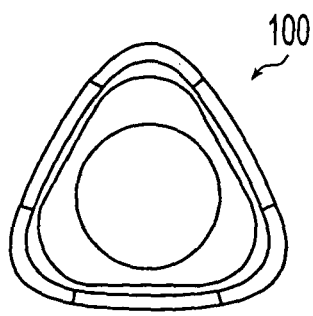
FIG. 5 is an end view along line V—V of FIG. 3.

Other or additional surface modifications or enhancements may be made to outer layer 20 to result in the desired properties or characteristics of grip element 10. For instance, other recessed patterns may be formed on the exterior surface of outer layer 20, such as dimples 50 as shown in FIG. 3. Dimples 50 may be any desired shape (e.g., round, oval, etc.) and spaced apart to provide the desired comfort, as readily determinable by one of ordinary skill in the art. Alternatively, or in addition, an elevated pattern may be provided on outer layer 20, such as circumferentially or axially extending ribs, bumps, or a lattice or honeycomb pattern. Such pattern preferably extends above the smooth surface of outer layer 20 a sufficient amount to be resiliently deformable to further enhance the desired effect of outer layer 20. Such pattern may, instead, be recessed into the surface rather than being raised above the surface. Moreover, the surface of outer layer 20 need not even be smooth, but may be textured, roughened, or otherwise not smooth to increase the desired effect of outer layer 20. Although grip element 10 may be substantially tubular with a constant diameter, as in the embodiment of FIGS. 1 and 2, grip element 10 may be formed in any other shape. For instance, grip element 100 of FIGS. 3–5 has a triangular cross-section with rounded corners and is tapered. Tapering may be achieved either by tapering the thickness of outer layer 20 and/or support structure 30 and/or by tapering the inner and outer diameters of outer layer 20 and/or support structure 30, regardless of whether the thickness of either remains constant or tapers as well.

As mentioned above, outer layer 20 is supported by a support structure 30 which imparts to grip element 10 a defined shape which facilitates insertion of grip element 10 over an article. In particular, support layer 30 insures that receiving channel 12 remains open and does not collapse during manipulation of the soft, compressible outer layer 20 (which would likely collapse without the support of support structure 30). Accordingly, support structure 30 is sufficiently rigid to maintain the desired configuration of grip element 10. Exemplary materials which may be used to form support structure 30 include thermoplastics (which are relatively easy to manufacture and are relatively low cost materials) or thermoset materials. If desired, the same material, in different hardnesses (such as measured under the Shore A hardness scale) may be used to form cover layer 20 and support structure 30. On the other hand, if outer layer 20 is to be formed over a preformed support structure, then support structure 30 may be made of a material more diverse from the material of outer layer 20, such as metal (e.g., steel). It is noted that a grip element 10 which is formed separately from the article over which it is to be positioned preferably has an outer layer 20 and a support structure 30 with the same longitudinal extent along longitudinal axis 14. Thus, support structure 30 preferably supports the entire extent of outer layer 20 and does not extend beyond the extent of outer layer 20 unnecessarily.

In order to minimize the cost increases which result from providing such a rigid underlying substrate, support structure 30 preferably has a wall thickness which is as thin as possible yet which still permits support structure 30 to achieve its support function. In addition, support structure 30 also is preferably sufficiently thin to not add undue bulk to grip element 10 without imparting comfort thereto, since support structure 30 generally is intended for support purposes and need not be deformable in response to gripping. Such thickness, as will be appreciated by one of ordinary skill in the art, depends on the material from which support structure 30 is formed. For instance, if a thermoplastic material is used (as may be desirable if grip element 10 is to have additional features as described below), the thickness of support structure 30 may be 1 mm or less, preferably less than 0.5 mm, such as 0.25±0.05 mm.

The shape and configuration of support structure 30 preferably is selected to further facilitate manufacture. Thus, in order to reduce manufacturing costs, support structure 30 may have a relatively simple shape such that complex manufacturing equipment, such as molds, is unnecessary. For instance, support structure 30 may be in the form of a simple tube which is relatively simple to manufacture. Such shape facilitates injection molding of support structure 30 in a simple mold cavity or extrusion of support structure 30 as a tube cut to a desired appropriate length.

The materials and method of manufacturing grip element 10 maybe selected to achieve a permanent bond between outer layer 20 and support structure 30. The resulting outer layer 20 thus would not peel back or roll away from the support structure 30 during normal use and also during normal use over the life of grip element 10. Such adherence of outer layer 20 to support structure 30 increases the wear and life of grip element 10 and also imparts a higher degree of perceived quality to grip element 10. However, it will be appreciated that outer layer 20 may instead be maintained on support structure 30 by hoop strength alone without detracting from other aspects of the present invention.

If a permanent bond is to be achieved between outer layer 20 and support structure 30, the bond is preferably achieved such that an intervening or intermediate element necessary to bond outer layer 20 to support structure 30 is unnecessary. A direct permanent bond such as a thermal or chemical bond is preferable. Such direct permanent bond may be achieved as a result of a co-molding process in which both materials are at least semi-flowable and thus may bond to each other. Support structure 30 and outer layer 20 thus may be formed by a two-shot or two-step two-material injection molding process in which the materials from which support structure 30 and outer layer 20 are formed are injected, either simultaneously or consecutively, into the respective mold in which the element is to be formed. The mold cavities for forming outer layer 20 and support structure 30 may either be formed in the same mold or in separate molds. Other methods of manufacture are also contemplated, such as, but not limited to, coinjection molding, coextrusion or a two-step process performed in a single mold cavity. For example, outer layer 20 and support structure 30 may be co-extruded and cut to a desired length. Any surface modification may be made either during the coextrusion process or afterwards, such as by a heat forming process. A heat forming process may use heated dies which may melt and reform outer layer 20 into a desired shape or pattern.

As would be apparent to one of ordinary skill in the art, if outer layer 20 and support structure 30 are to be bonded together, the materials thereof should be selected for compatibility as well as to satisfy the above-described desired properties of these components of grip element 10. Preferably, both outer layer 20 and support structure 30 are formed from thermoplastic materials to achieve a mechanical and/or chemical bond therebetween.

However, if outer layer 20 is to remain secured over support structure 30 by hoop strength and not necessarily by a direct bond thereto, grip element 10 may be formed by an insert mold process. Such process involves either forming support structure 30 in a mold, or placing a pre-formed support structure 30 (e.g., separately formed, such as by extrusion) into a mold, and then injecting the material from which outer layer 20 is to be formed over support layer 30. As a result, the soft material from which outer layer 20 is formed is overmolded over support structure 30 to form outer layer 20.

It will be appreciated that grip element 10 need only extend over the gripping portion of the article on which grip element 10 is provided. Accordingly, the overall longitudinal extent of support structure 30 and hence grip element 10 may be relatively short, particularly when compared to the length of the article. In addition, support structure 30 preferably is formed from a relatively rigid material and therefore may be relatively thin (e.g., only thick enough as necessary to maintain a desired shape), and outer layer 20 need only have a portion with an outer layer thick enough to provide cushioning, e.g., need not be greater than approximately 3 mm thick. As a result, the total thickness of grip element 10 may be less than 4 mm, at least at its thinnest section. More preferably, grip element 10 has a thickness of less than 2.5 mm and most preferably a thickness of less than 1.375±0.05 mm, at least at its thinnest section. In addition, as applied to a writing instrument, the total diameter of grip element 10 need not be greater than approximately 1.2 cm. Similar principles may be applied to grip elements for other articles. As a result, a larger number of grip elements may be formed from a given quantity of material than would be formed if grip element 10 were to extend over the entire article. Moreover, if grip element 10 is formed by an injection molding process, more molds may be formed within the predetermined confines of a mold press, thereby resulting in a higher production rate than would be achievable if a larger grip element were formed.

As will further be appreciated, soft outer layer 20 with underlying support structure 30 is easier to handle and to manipulate during manufacture and assembly of an article which is to be assembled with a grip element 10 thereon. If desired, the article may be constructed with grip element 10 formed as a component thereof or a feature thereof preassembled and sold with the article. Moreover, grip element 10 may be permanently coupled to the article. Alternatively, if replaceability is desirable, grip element 10 need not be permanently connected to an article. Instead, grip element 10 may be formed as a replaceable element which can readily slide on and off the article for replacement as desired.

It will be appreciated that the various features described herein may be used singly or in any combination thereof. Therefore, the present invention is not limited to only the embodiments specifically described herein. While the foregoing description and drawings represent a preferred embodiment of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiment is therefore to be considered in all respects as illustrative and not restrictive, the scope of the invention being indicated by the appended claims, and not limited to the foregoing description.

What is claimed is:

1. A method of providing a soft, compressible and deformable grip element on a gripping portion of an article manipulatable by only the fingers, said method comprising:
providing a soft, compressible and deformable material over a rigid support structure to form a soft outer layer over said rigid support structure said outer layer being softer than said rigid support structure and being readily compressible and deformable in response to application of finger gripping pressure thereto, said soft, compressible and deformable layer being formed such that said soft, compressible and deformable layer alone, without the support of said support structure, would collapse on itself, and said support structure, having a receiving channel defined therein, sized, shaped and configured for receiving a portion of said article securely, and being sufficiently rigid and having a sufficient wall thickness to maintain said receiving channel in an open configuration, said wall thickness being as thin as possible and simple in shape so as to not add undue bulk to said grip element, wherein said outer layer is sufficiently deformable and thick to permit shifting in a direction other than a radial direction in response to application of finger gripping pressure thereto; and
placing said support structure with said soft, compressible and deformable material thereon over the gripping portion of the article, thereby providing a soft, compressible and deformable layer over the gripping portion of the article.

2. A method according to claim 1, further comprising first extruding or molding said support structure and then molding said soft, compressible and deformable material over said support structure.

3. A method according to claim 1, further comprising co-molding said soft outer layer and said support structure.

4. A method according to claim 3, further comprising co-molding said soft outer layer and said support structure by a two-shot two-material injection molding process.

5. A method according to claim 1, further comprising coextruding said soft, compressible and deformable material with a more rigid material to form said soft, compressible and deformable material as a covering over said rigid support structure.

6. A method according to claim 1, further comprising molding said soft, compressible and deformable material over said support structure.

7. A method according to claim 1, further comprising extruding or molding said support structure.

8. A method according to claim 1, wherein said support structure is formed without complex manufacturing equipment.

9. A method according to claim 8, wherein said support structure is open-ended.

10. A method according to claim 1, wherein said grip element has a substantially tubular shape and at least one of a constant thickness and a constant outer diameter.

11. A method of providing a soft, compressible and deformable grip element on a gripping portion of an article manipulation by only the fingers, said method comprising:
extruding a support structure with a receiving channel defined therein, said receiving channel being sized, shaped and configured for receiving a portion of said article securely, and being sufficiently rigid and having a sufficient wall thickness to maintain said receiving channel in an open configuration, said wall thickness being as thin as possible and simple in shape so as to not add undue bulk to said grip element;
molding a soft, compressible and deformable material over said support structure to form a soft outer layer over said support structure said outer layer being softer than said rigid support structure and being readily compressible and deformable in response to application of finger gripping pressure thereto, said soft, compressible and deformable layer being formed such that said soft, compressible and deformable layer alone, without the support of said support structure, would collapse on itself, wherein said outer layer is sufficiently deformable and thick to permit shifting in a direction other than a radial direction in response to application of finger gripping pressure thereto; and
placing said support structure with said soft, compressible and deformable material thereon over the gripping portion of the article, thereby providing a soft, compressible and deformable layer over the gripping portion of the article.

12. A method of forming a soft, compressible and deformable grip element for positioning on a gripping portion of an article manipulate by only the fingers, said method comprising:
coextruding a soft, compressible and deformable material with a more rigid material to form a soft, compressible and deformable material as a covering over a rigid support structure with a receiving channel defined therein said covering being softer than said rigid support structure and being readily compressible and deformable in response to application of finger gripping pressure thereto;
wherein said coextruding further comprises:
extruding said rigid material to be sufficiently rigid and to have a sufficient wall thickness to maintain said receiving channel in an open configuration;
extruding said rigid material to have a wall thickness as thin as possible to not add undue bulk to said grip element;
extruding said soft, compressible and deformable material such that said soft, compressible and deformable layer alone, without the support of said support structure, would collapse on itself, wherein said covering is sufficiently deformable and thick to permit shifting in a direction other than a radial direction in response to application of finger gripping pressure thereto.

* * * * *